G. B. Turrell,
Lard Cooler.
No. 43,352.         Patented June 28, 1864.
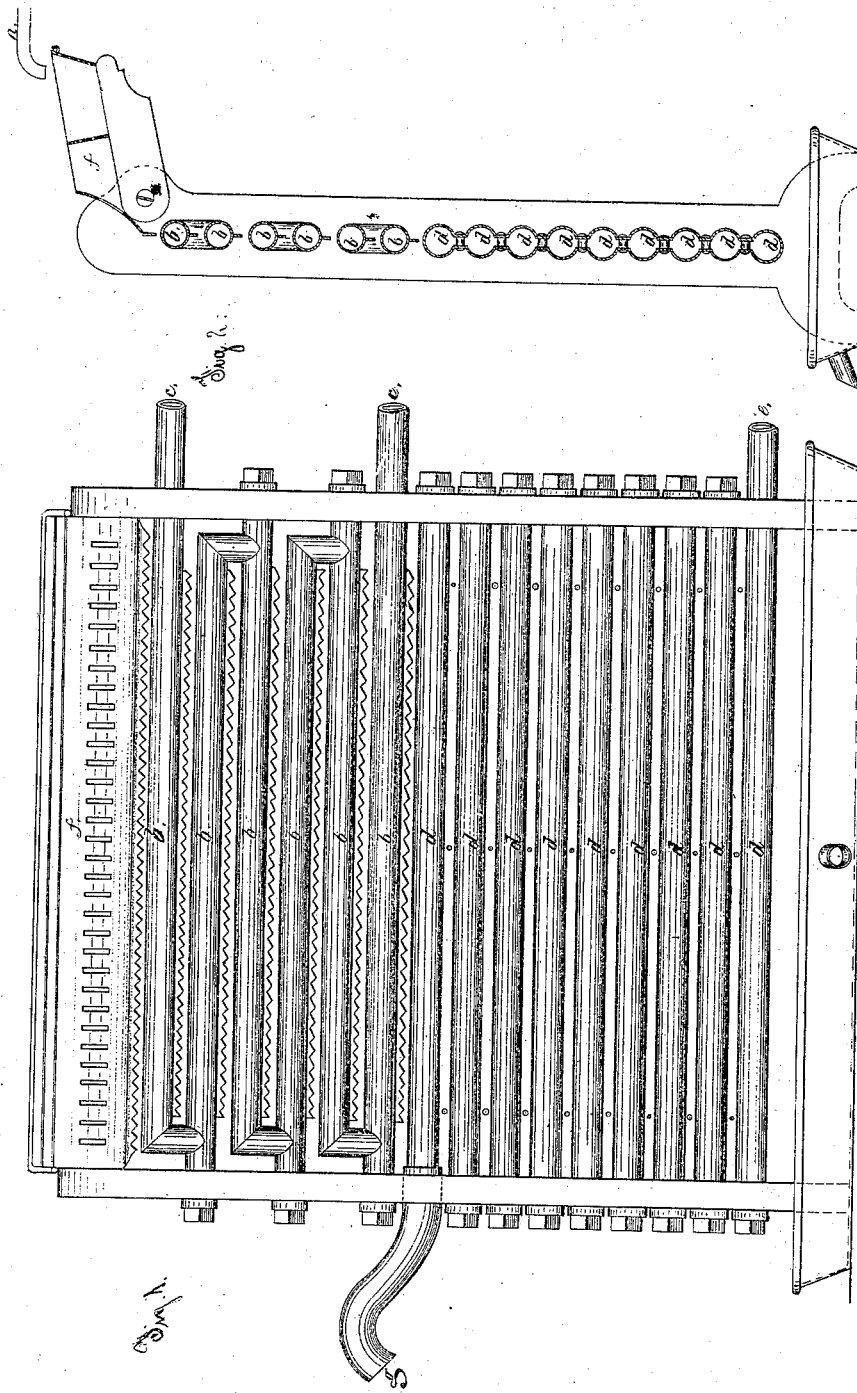

UNITED STATES PATENT OFFICE.

GEORGE B. TURRELL, OF NEW YORK, N. Y.

IMPROVED MODE OF TREATING LARD, TALLOW, &c.

Specification forming parts of Letters Patent No. 43,352, dated June 28, 1864.

*To all whom it may concern:*

Be it known that I, GEORGE B. TURRELL, of the city and State of New York, have invented a certain Improvement in Treating Lard, Tallow, &c., previous to putting the same into barrels, casks, and other vessels; and I do hereby declare the following to be a full, clear, and exact description of the said invention, reference being had to the annexed drawings, making part of this specification, wherein—

Figure 1 is a side elevation, and Fig. 2 is a cross-section, of my apparatus.

Similar marks of reference denote the same parts.

Lard, tallow, and other fatty matters are tried out quite extensively by steam under pressure applied to the animal substances in a boiler or other vessel. This operation extracts a very pure and white article, but in consequence of the presence of watery particles such lard is not as good as the lard, fat, &c., tried out by fire heat or heat applied outside the boiler, because such watery particles cause the lard or fat to become rancid much sooner.

The nature of my said invention consists in a mode of treating such fatty materials after the same have been tried by the direct application of steam; and this mode consists in first exposing the lard or other fatty materials, as they pass from the boiler in a heated state, to the action of a sufficient heat to remove the watery particles; and, second, in exposing such materials to a cooling operation, whereby the fatty materials are reduced in temperature and granulated so as to be in a condition for packing into barrels, casks, &c., for in cases where the lard is too hot when placed in any receptacle, the central portions, cooling last, are not of such fine grain or good quality as the outer parts.

In the drawings, $a$ is a pipe from which the melted lard or fat is supplied and distributed by a perforated trough, $f$, over a vertical range of horizontal pipes or corrugations, $b$, which are heated by steam introduced at the pipes $c\ c$. This portion of the apparatus heats the lard and evaporates any moisture as the fatty matter runs or trickles in a thin stratum over the said surfaces, and in this operation any odors in the same are allowed to pass off. The lard or fatty matter, continuing to trickle, passes over the pipes or corrugated surfaces $d$, that are cooled by a circulation of water introduced at $e$ and escaping at $g$, and by this means the temperature is reduced as low as convenient for introducing the lard into tubs or other receptacles. By this method of first heating the steam-rendered lard or fatty matter for the evaporation of the aqueous and volatile portions all impurities that tend eventually to render the lard or fatty material rancid are removed, so that the same is of a much better quality; and, second, by cooling the lard or fatty material so that it is only sufficiently warm to be soft enough to run into or be packed in barrels or other vessels said material is much more uniform in quality throughout than in cases where the said fatty material granulates or cools entirely in such tubs.

What I claim, and desire to secure by Letters Patent, is—

The method herein specified of treating lard or other fatty material for the removal of aqueous and volatile portions, and the cooling of such material, in substantially the manner and for the purposes specified.

In witness whereof I have hereunto set my hand this 4th day of June, A. D. 1864.

GEO. B. TURRELL.

Witnesses:
LEMUEL W. SERRELL,
THOS. GEO. HAROLD.